Aug. 7, 1951 D. S. PENSYL 2,562,943
FREQUENCY CONTROL APPARATUS
Filed Dec. 30, 1943 5 Sheets-Sheet 1
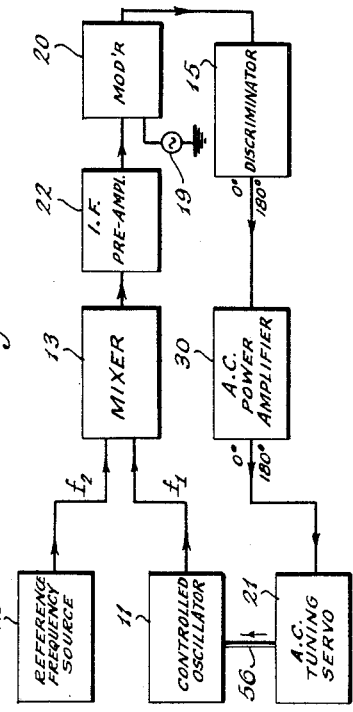
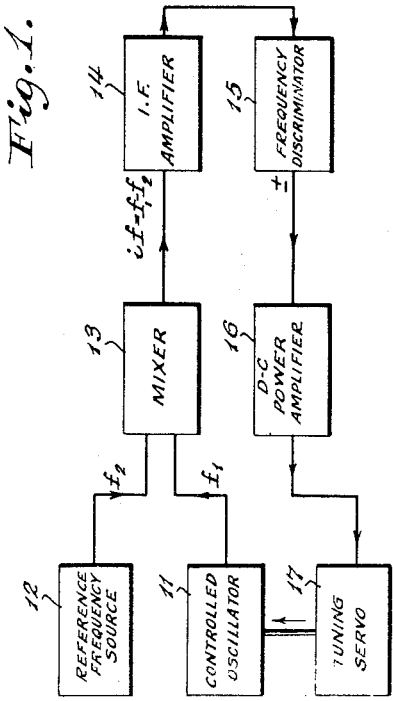
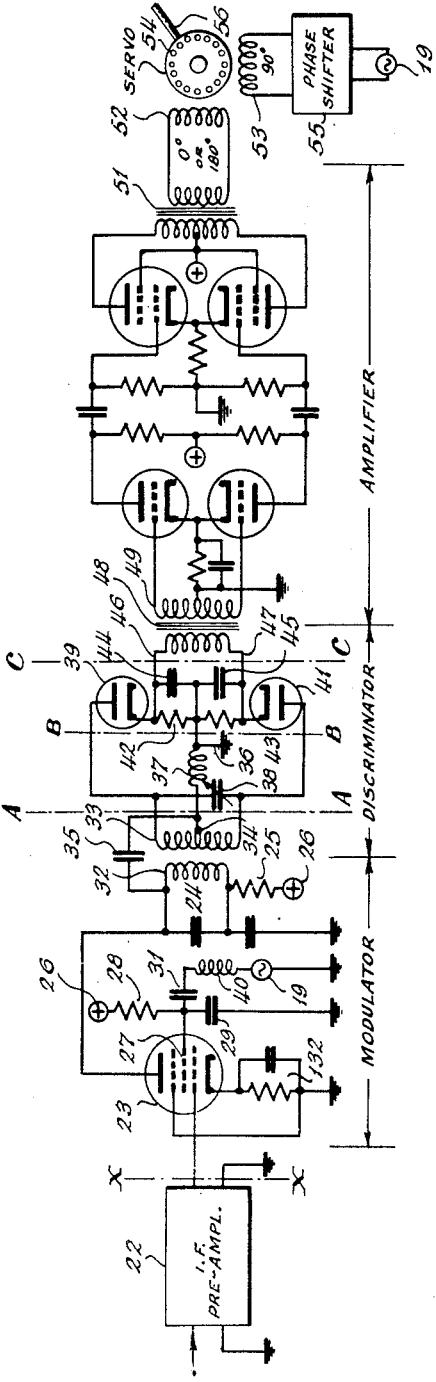
INVENTOR
DANIEL S. PENSYL
BY
ATTORNEY Aug. 7, 1951          D. S. PENSYL          2,562,943
FREQUENCY CONTROL APPARATUS
Filed Dec. 30, 1943          5 Sheets-Sheet 2
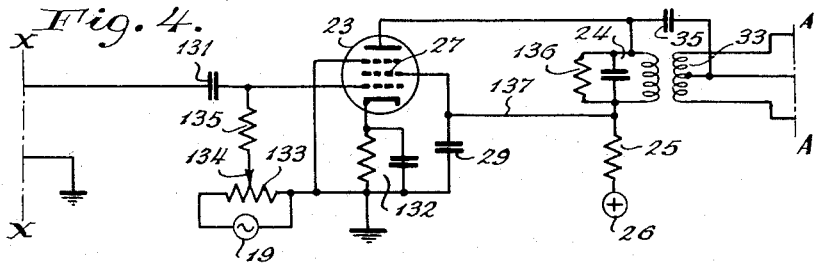
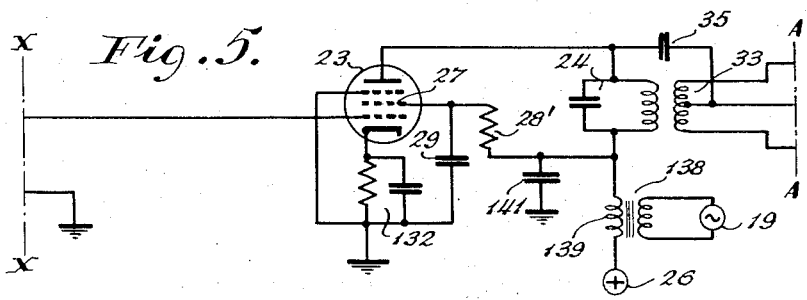
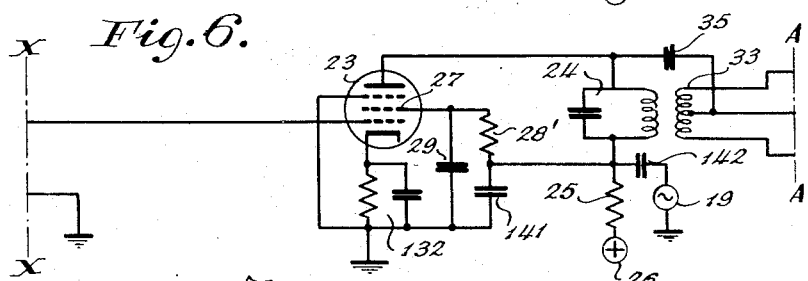
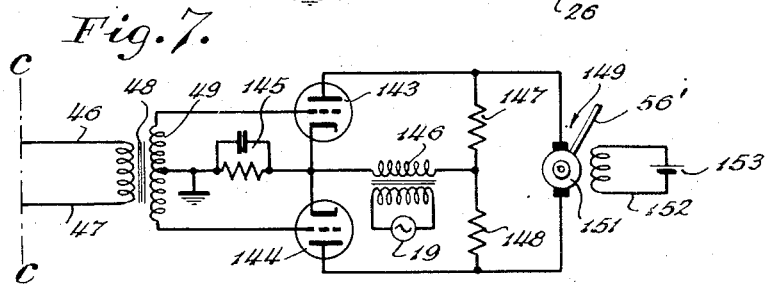
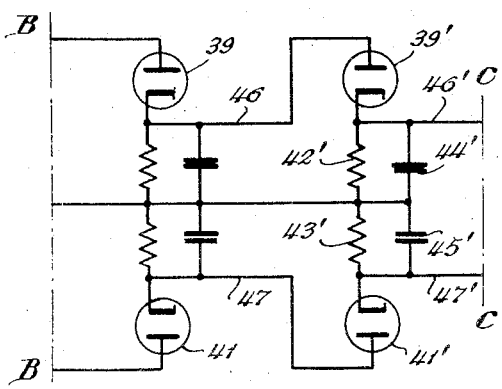
INVENTOR
DANIEL S. PENSYL
BY
ATTORNEY

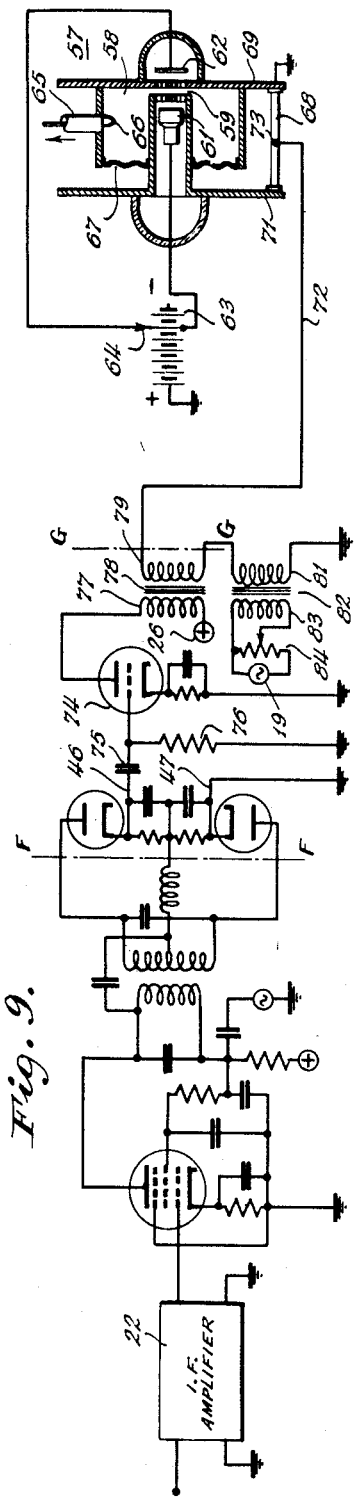

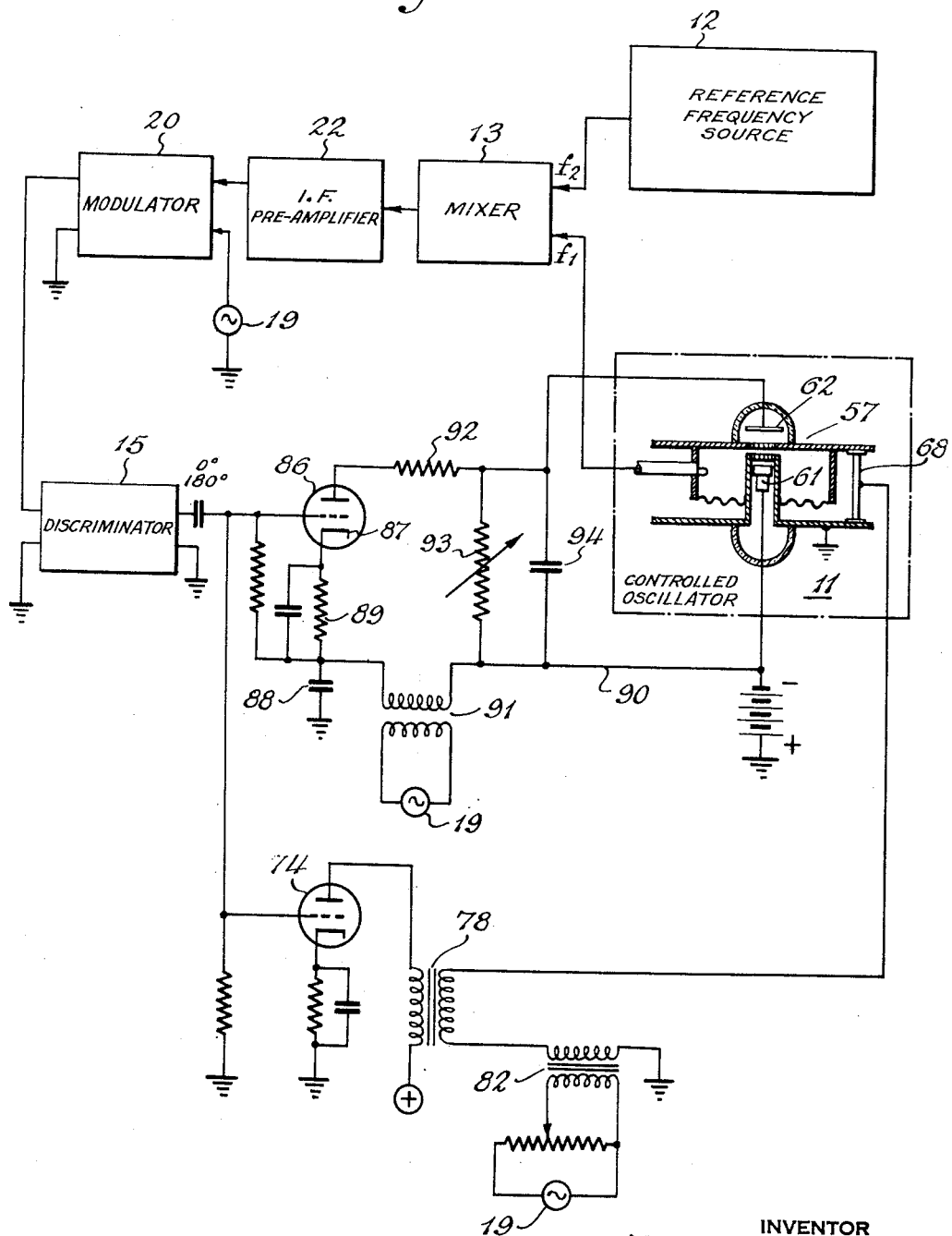

Aug. 7, 1951  D. S. PENSYL  2,562,943
FREQUENCY CONTROL APPARATUS
Filed Dec. 30, 1943  5 Sheets-Sheet 5
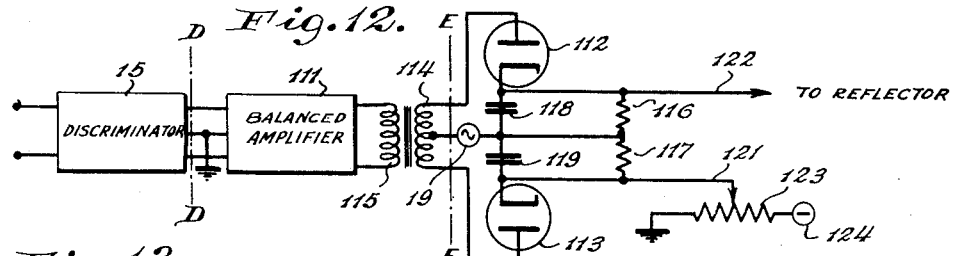
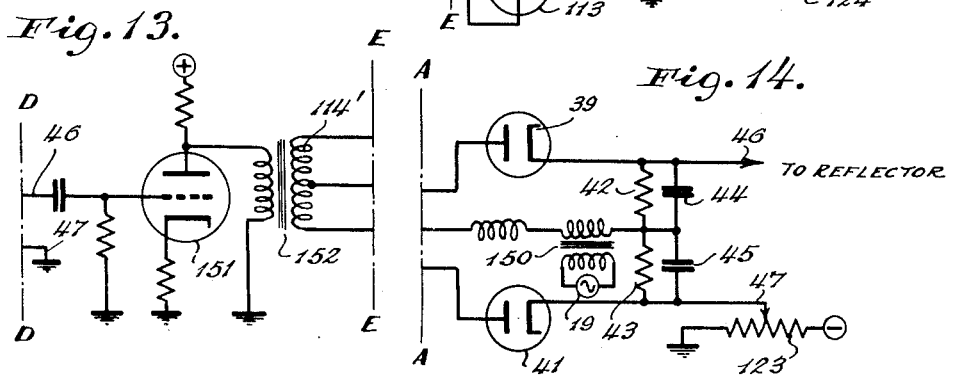
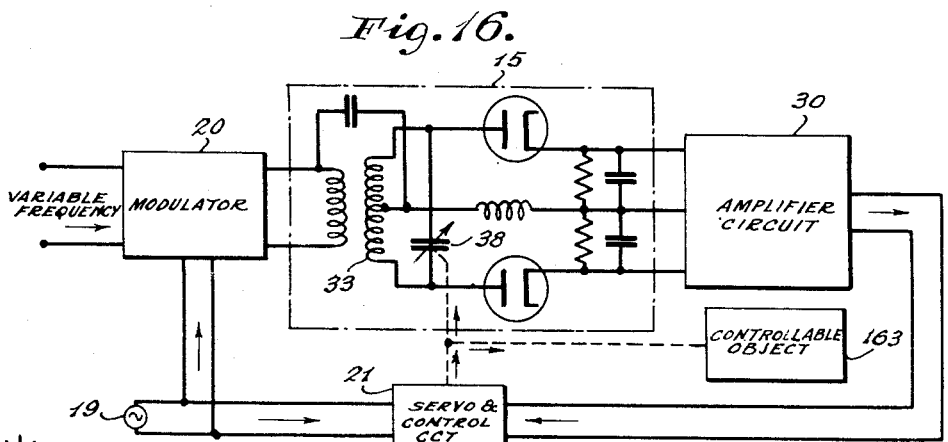
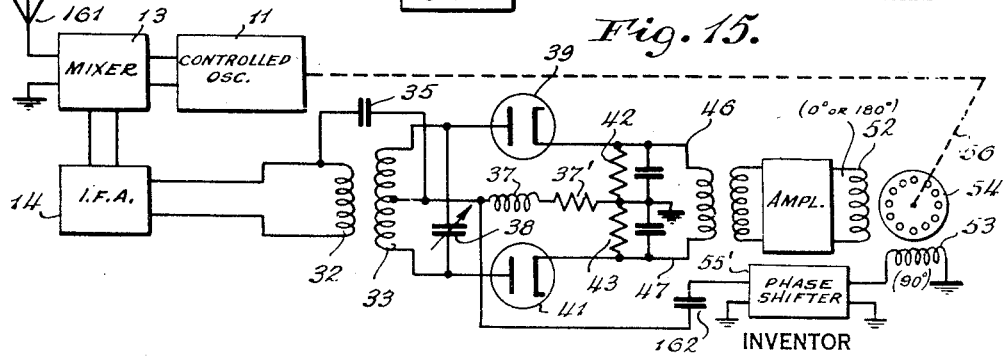
INVENTOR
DANIEL S. PENSYL
BY Paul B. Hunter
ATTORNEY Patented Aug. 7, 1951

2,562,943

UNITED STATES PATENT OFFICE 2,562,943

FREQUENCY CONTROL APPARATUS

Daniel S. Pensyl, Garden City, N. Y., assignor to The Sperry Corporation, a corporation of Delaware Application December 30, 1943, Serial No. 516,223

6 Claims. (Cl. 250—36)

The present invention relates to the art including automatic frequency control systems for high frequency oscillators, and is especially adapted for maintaining such oscillators in predetermined frequency relation to a reference or standard frequency. Such a reference or standard frequency may be provided either by a received wave, as where the present invention is applied to a high frequency receiving system of the superheterodyne type, or by a source of fixed frequency, usually of high frequency stability, such as a crystal-controlled oscillator, as where the present invention is applied to produce a controlled frequency in predetermined relation to such a reference or standard frequency. This latter use of the present invention may involve maintaining a high power oscillator in frequency synchronism with a low power but highly stabilized reference or standard frequency, as in high power radiant energy transmission.

Frequency control systems of the present type are known in which the difference between the reference frequency and the controlled frequency is obtained from a suitable mixer or detector, and deviation of this difference frequency from a desired or predetermined value produces a control signal which is then utilized to maintain the controlled frequency at the proper or desired frequency difference with respect to the reference frequency. In such prior art systems, the difference or intermediate frequency is usually applied through an amplitude limiter to a frequency discriminator which produces a reversible-polarity unidirectional output control voltage having a polarity corresponding to the sense of deviation of the intermediate frequency from its desired value, and having a magnitude corresponding and usually directly proportional to this frequency deviation. The controlled frequency oscillator is provided with a tunable element actuated by suitable servo mechanism which, in turn, is controlled by the discriminator output voltage.

Since the discriminator output is usually of a relatively low order of magnitude, such prior art systems generally require considerable amplification to efficiently control the tuning servo mechanism from the discriminator output signal, so that suitable types of direct current amplifiers must be provided. As is well known, the amplification of direct current signals offers considerable complexity and disadvantage with respect to the corresponding amplification of alternating current signals, and these disadvantages and complexities are inherent in the prior art systems mentioned. According to the present invention, these disadvantages and accompanying complexities of structure and circuit are avoided by producing, in simple fashion, a reversible-phase alternating current control signal which corresponds in phase-sense to the sense of deviation of the intermediate frequency with respect to its desired value, and in amplitude to the magnitude of this frequency deviation. With such an alternating current signal output from the discriminator, relatively simple alternating current amplifiers may be utilized, together with relatively simple alternating-current-energized servo mechanisms.

According to the present invention, these results are obtained by modulating the intermediate frequency wave by a suitable low frequency wave corresponding to the frequency at which the alternating current servo is to operate, before application thereof to the discriminator. The output of the discriminator is then a reversible-phase alternating current signal suitable for simple amplification and ready utilization in relatively simple servo devices.

Accordingly, it is an object of the present invention to provide improved frequency control systems having an alternating current frequency-dependent control signal for use in controlling frequency.

It is another object of the present invention to improved automatic frequency control systems in which a controlled frequency is maintained in fixed frequency relation to a reference frequency by deriving a difference frequency and utilizing this difference frequency to produce an alternating current frequency-dependent signal for adjusting the controlled frequency to maintain its desired relationship with respect to the reference frequency.

It is a further object of the present invention to provide an improved frequency control system in which an alternating frequency-dependent control signal is produced by modulating a frequency to be controlled and passing the modulated wave through a frequency discriminator to produce the control signal for controlling frequency as desired.

It is still another object of the present invention to provide an improved automatic frequency control system for ultra high frequency oscillators of the thermally-tuned type, which may utilize the principles discussed above.

It is yet another object of the present invention to provide improved automatic frequency control systems for a "reflex klystron" oscillator, such as disclosed in Fig. 2 of U. S. Patent No. 2,250,511, which may incorporate the novel features discussed above.

It is a further object to provide improved automatic tuning apparatus, suitable for keeping a controlled frequency in correspondence with a reference frequency, or for keeping a tuned circuit in syntonism with a reference wave.

It is a still further object to provide improved apparatus for actuating a controlled object in accordance with the frequency of a controlling wave.

Other objects and advantages of the present invention will become apparent from the following specification and drawings, wherein, Fig. 1 is a block schematic diagram of a prior art system;

Fig. 2 is a block schematic diagram of a system incorporating the present invention;

Fig. 3 is a schematic wiring diagram of a portion of the system of Fig. 2 and illustrating the present invention;

Figs. 4, 5, 6, 7 and 8 are schematic wiring diagrams of circuits useful in the system of Fig. 3;

Fig. 9 is a schematic wiring diagram similar to Fig. 3 and illustrating the application of the principles of the present invention to the frequency control of a "reflex klystron" oscillator;

Fig. 9A is a schematic wiring diagram of a circuit useful in the system of Fig. 9;

Fig. 10 is a schematic wiring diagram similar to Fig. 9 and showing the simultaneous thermal and electrical tuning control of a "reflex klystron" oscillator;

Fig. 10A is a diagram similar to Fig. 10 showing the arrangements of Figs. 2 and 10 interconnected in a complete frequency control system, corresponding reference numerals being retained throughout.

Fig. 11 is a schematic wiring diagram of another form of frequency control system for a "reflex klystron" oscillator;

Fig. 12 is a schematic wiring diagram of a frequency control system similar to that of Fig. 11;

Fig. 13 is a schematic wiring diagram of a circuit useful in the system of Fig. 12;

Fig. 14 is a schematic wiring diagram of a circuit useful in the system of Fig. 3;

Fig. 15 is a schematic wiring diagram of a similar circuit; and

Fig. 16 is a schematic wiring diagram of another circuit.

Referring to Fig. 1 rectangle 11 schematically designates a controlled oscillator whose output frequency $f_1$ is to be maintained in fixed frequency relation to a reference frequency $f_2$ produced by a suitable source 12. As an illustrative example, the system may operate to maintain the frequency $f_1$ of oscillator 11 at a fixed frequency difference with respect to frequency $f_2$ of source 12. For this purpose, the output frequencies $f_1$ and $f_2$ of oscillator 11 and source 12 are supplied to a mixer 13, which may be of any conventional type adapted to produce an intermediate frequency in its output having a value equal to the difference between the frequencies $f_1$ and $f_2$ supplied to mixer 13.

This intermediate frequency may be suitably amplified, if desired or necessary, in any conventional intermediate frequency amplifier 14 whose output is then supplied to a frequency discriminator 15. Frequency discriminator 15 may be of the type discussed more in detail with respect to Fig. 3, or as is well known, may comprise suitable circuits tuned, respectively, slightly above and slightly below the desired intermediate frequency value, each of these circuits being connected to a suitable rectifier whose output unidirectional voltages are connected in opposition, whereby zero resultant output is produced when the input frequency is exactly between the tuned circuit frequencies. Positive or negative outputs from the discriminator will then be produced accordingly as the input frequency shifts toward the resonant frequency of one or the other of these tuned circuits. Such frequency discriminators are well known in the art and require no further description here.

It will thus be apparent that the output signal produced by discriminator 15 will be a reversible-polarity variable-magnitude frequency-responsive unidirectional signal. This output signal is then amplified by a suitable direct current amplifier 16 for actuating a tuning servo mechanism 17 which modifies the frequency of the controlled oscillator 11 in such a manner that any deviation in the controlled frequency, resulting in a change in intermediate frequency from the value determined by the discriminator 15, will serve to restore the controlled frequency to the value producing the desired intermediate frequency by operation of the system just described.

As has been discussed above, this system is subject to the disadvantages inherent in direct current power amplifiers. Such direct current apparatus is generally more complicated and harder to maintain in desired operation condition than corresponding alternating current apparatus, as well as being more harmfully susceptible to changes in power supply, aging, etc.

According to the present invention, these disadvantages are completely overcome by permitting the use of alternating current power amplifiers with alternating current or direct current servo mechanism, as desired, in extremely simple fashion. One form of the system of the present invention is illustrated in Fig. 2. In this figure the amplifier 14 of Fig. 1 is replaced by, or modified to serve as, a pre-amplifier 22 and modulator 20. The modulator 20 may form the last stage of the amplifier 14, to which a suitable alternating voltage is applied. The output of the modulator unit 18 therefore will represent the intermediate frequency wave amplitude-modulated in accordance with a wave of suitable frequency which may be derived from a source such as 19 connected thereto. Source 19 in this instance is chosen to have a frequency suitable for use with alternating current servos, which may, for example, be within the range from 30 to 400 cycles per second, for certain types of servo, although the frequency need not be restricted to this range. This frequency may be termed the "control frequency."

This modulated intermediate frequency wave is then supplied to the discriminator 15 whose output, as discussed more in detail below with respect to Fig. 3, will then be a reversible-phase variable-magnitude frequency-sensitive alternating current signal, rather than the former reversible-polarity unidirectional signal of the prior art illustrated by Fig. 1. This alternating current signal may then be amplified by a suitable alternating current amplifier 30 which actuates the alternating current tuning servo 21 to control the oscillator 11 as before.

Fig. 3 illustrates one form which the modulator 18, discriminator 15, amplifier 30 and servo 21 may assume. The amplifier 22 and modulator 18 may be provided by a standard type of pentode or multi-grid intermediate frequency amplifier, the last stage of which is adapted to function as a modulator, by impressing the alternating voltage from source 19 upon a screen grid thereof. The preamplifier 22 may have any desired number of conventional amplification stages. The output of preamplifier 22 is fed to the modulator tube 23 which is in the form of a conventional pentode amplifier, whose anode is connected through a parallel tuned circuit 24 and de-coupling resistor 25 to the positive terminal of a voltage source 26 supplying anode voltage to the modulator 23. The negative terminal of this source is grounded. The screen grid 27 of tube 23 is also supplied with fixed potential from source 26 or any other desired positive voltage source, through a voltage dropping resistor 28. Condenser 29 serves to by-pass any intermediate frequency or high frequency components of the voltage applied to the screen grid 27. Tube 23 operates as a modulator by connecting the alternating voltage from source 19 to screen grid 27 through a suitable blocking condenser 31 and intermediate frequency choke coil 40. By so doing, the output intermediate frequency voltage occurring across the parallel tuned circuit 24 tuned thereto, will be amplitude-modulated at the frequency of source 19.

Circuit 24 is coupled to the discriminator 15 by having its coil 32 magnetically coupled to a center-tapped coil 33, whose center-tap 34 is connected to the anode of tube 23 by means of condenser 35. Center-tap 34 is also connected to ground at 36 through a radio frequency choke coil 37 which effectively grounds tap 34 with respect to direct currents, but insulates tap 34 from ground with respect to intermediate frequency currents. Coil 33 may be tuned to the intermediate frequency by a suitable condenser 38.

In this manner, the resultant voltages appearing between the respective outer terminals of coil 33 and ground will be equal only for an intermediate frequency input of the same frequency as that to which circuit 33, 38 is tuned, as is well-known in conventional frequency discriminators. Upon deviation of the input frequency from this tuned frequency in one sense, one of these voltages will be greater in magnitude than the other. A deviation of the input frequency from this tuned frequency function in opposite sense, will make the other of these voltages greater than the first. These voltages are respectively rectified by rectifiers 39 and 41, illustrated as being of the diode type, which have respective load resistors 42 and 43. These resistors 42 and 43 are by-passed with respect to intermediate frequency currents by respective by-pass condensers 44 and 45.

The capacitances of condensers 44 and 45 are made sufficiently large so that they will function efficiently as intermediate frequency by-pass condensers, but also sufficiently small so that they will offer high impedances to currents of the control or modulating frequency from source 19. By this circuit, the voltage appearing across resistors 42 and 43 will be demodulated versions of the voltage applied to the rectifiers 39, 41; that is, will be of the modulating frequency of source 19. When the discriminator input intermediate frequency is equal to the desired value, represented by the frequency to which the discriminator is tuned, the alternating voltages appearing across resistors 42 and 43 will be equal in magnitude and opposite in polarity, or phase sense, so that the resultant appearing across output leads 46 and 47 will be zero in this instance.

Upon deviation of the input frequency from the desired frequency in one sense, the voltage across resistor 42 will become larger than that across resistor 43, producing an output alternating voltage component of the modulating frequency and across leads 46 and 47 and of predetermined phase sense. Upon deviation of the input intermediate frequency from its desired value in opposite sense, the voltage across resistor 43 will be larger than that across resistor 42, producing an output modulating frequency voltage component across leads 46 and 47 of the opposite phase-sense.

Leads 46 and 47 are connected to the primary of an output transformer 48 so that the direct current components of the voltages across resistors 42 and 43 will have no effect upon the bias of following amplifiers. The secondary winding 49 of transformer 48 is connected to the input of a conventional push-pull alternating current two-stage amplifier, shown in Fig. 3, which produces a greatly amplified alternating current signal in the output transformer 51 of this amplifier.

This output signal may then be supplied to one field winding 52 of the servo 21, illustrated in this instance as being a two-phase induction motor 54. The second field winding 53 of motor 54 is supplied with alternating current from source 19 through a phase shifter 55 which assures that the current in winding 53 will be in phase quadrature with the current in coil 52. The output shaft 56 of motor 54 may be utilized to mechanically actuate a tuning control for oscillator 11. Oscillator 11 may, for example, assume the form shown by controlled oscillator 2 of U. S. Patent 2,294,942, whereby its output frequency may be adjusted by suitable actuation of shaft 56 connected to the adjustable frequency-determining element of oscillator 11.

In operation, when the intermediate frequency is at its desired value, zero signal is produced by discriminator 15 so that no current is supplied to winding 52 of servo 54. Under these conditions the servo is immobile. Upon deviation of the intermediate frequency from its desired value in one sense or the other, a correspondingly reversible-phase alternating signal will be produced by discriminator 15, producing an output current in winding 52 of corresponding phase-sense. For either sense of frequency deviation, however, the current in coil 52 will be in phase quadrature with respect to that in winding 53. Accordingly, the servo 54 will rotate in one direction or the other in accordance with the phase-sense of the energy supplied to its coil 52, and, accordingly, in correspondence with the sense of frequency deviation. Motor 54 then retunes the oscillator 11 and varies its output frequency in the proper sense to restore the intermediate frequency to the desired value. It will be seen, therefore, that the present system utilizes alternating current amplifier and servo means completely, by the very simple device of modulating the intermediate frequency before application thereof to the discriminator.

It is to be understood that the present invention is in no way restricted to the particular type of modulator disclosed in Fig. 3. Figs. 4, 5 and 6 illustrate different forms of modulator which have been found to be useful in practicing the present invention. The circuit of each of these figures is intended to replace the equivalent portion of the circuit between lines X—X and A—A of Fig. 3. Thus, referring to Fig. 4, the output of pre-amplifier 22 is connected to the control grid of modulator 23 through a coupling and blocking condenser 131. The cathode of tube 23 is connected to ground through biasing resistor and by-pass condenser arrangement 132, as in Fig. 3. The source 19 is now connected across a variable voltage divider 133, one terminal of which is grounded, and whose variable tap 134 is connected to the modulator control grid through a coupling resistor 135. The output tuned circuit 24 may be shunted by a resistor 136 adapted to widen the band width in well-known manner. In this circuit the modulator screen grid 27 is connected directly to the resistor 25 by a lead 137, which connection may also be utilized in Fig. 3 if desired. It will be seen, therefore, that the circuit of Fig. 4 is, in effect, a control grid circuit modulator, in distinction to the screen grid modulator of Fig. 3.

Fig. 5 shows another form of modulator in which the source 19 is connected in series with both the screen and anode voltages by its connection to the primary of a transformer 138 whose secondary 139 is connected in series between tuned circuit 24 and positive voltage source 26. Modulator screen grid 27 may be connected to winding 139 through a voltage dropping resistor 28' whose remote end may be optionally by-passed to ground with respect to intermediate frequencies by by-pass condenser 141, so as to complete the plate circuit of tube 23 with respect to intermediate frequencies. In this manner, both anode and screen grid voltages of modulator 23 are varied at the modulating frequency, resulting in an output modulated intermediate frequency wave as in the preceding modifications.

Fig. 6 shows a modulator similar to that of Fig. 5. In this instance, in place of the transformer 138, the modulating frequency source 19 is connected to the junction between the anode resistor 25 and the tuned circuit 24 through a blocking condenser 142. The remainder of the circuit of Fig. 6 is similar to that of Fig. 5, and will operate in the same manner. It will be clear that any of these circuits may be used in the system of the invention, as desired.

Although the circuit of Fig. 3 has been described with respect to alternating current servos, it is to be understood that other types of servos may also be used therewith. Fig. 7 illustrates another type of servo which may be utilized in the circuit of Fig. 3, the circuit of Fig. 7 replacing that portion of the circuit of Fig. 3 to the right of the line C—C. Thus, the reversible-phase, alternating current signal from the discriminator appearing across leads 46 and 47 is passed through the transformer 48 having center-tapped secondary winding 49. This reversible-phase control signal is impressed in opposite phase upon the control grids of a pair of electron discharge tubes 143 and 144 which have a by-passed biasing resistor arrangement 145 in the common cathode connection thereof. The anode voltages for these tubes 143 and 144 are supplied thereto from source 19 by way of transformer 146 through respective load resistors 147 and 148, which may be by-passed (not shown) with respect to the modulating frequency if desired. A direct current motor 149 has its armature 151 connected across the resistors 147 and 148, and its field 152 is maintained at constant excitation from a suitable source such as a battery 153. Source 19 is adjusted in phase so that the anode voltage supplied to tubes 143 and 144 will be in phase coincidence or opposition with the grid voltages of these tubes.

In operation, and assuming zero control signal, the unidirectional components of the voltages appearing across resistors 147 and 148 will be equal and opposite, producing a net zero voltage across the armature 151 which accordingly remains stationary. Upon the appearance of a control voltage of predetermined phase-sense, tube 143 for example, will have a grid voltage impressed thereon which is in phase with the anode voltage thereof so that increased anode current will flow through resistor 147 at least during the positive half-cycles of the modulating frequency. At the same time the grid voltage of tube 144 is rendered more negative during the positive anode half-cycles, causing a decrease in current through resistor 148. In this way a net unidirectional voltage is applied to armature 151, causing rotation thereof in one direction. For a control signal output from the discriminator of opposite phase-sense, the reverse condition obtains, and an opposite polarity unidirectional voltage is impressed on armature 151, resulting in rotation thereof in opposite sense. The output shaft 56' of motor 149 then serves to actuate the frequency-determining element of oscillator 11 in a sense to change the frequency thereof in a direction reducing the magnitude of the control signal; that is, restoring the intermediate frequency to its desired value. It will be understood that the circuit of Fig. 7 may be utilized in place of the corresponding part of Fig. 3 or of Fig. 3 modified as in any of Figs. 4, 5 or 6. Also many other types of servos may be used.

In some types of systems in which the present invention may be utilized, the reference frequency wave may be derived by reception of a high frequency pulsed radiated wave after reflection thereof from some distant object. Accordingly, this reference wave will be a periodic sequence of pulses of high frequency energy. Under such circumstances, the output of the discriminator 15 of Fig. 3, instead of being a simple alternating voltage of the modulating frequency, will be a periodic pulse wave modulated by the modulating frequency, which may disrupt the desired control action. To overcome this effect, the time constants of the circuits 42, 44 and 43, 45 may be selected to be sufficiently large so that the pulses in the input wave are smoothed out and do not appear in the output. Under some circumstances this may require circuit values which are inconvenient to use and which may have a harmful effect upon the modulating frequency signal to be derived therefrom. To overcome this effect, the circuit shown in Fig. 8 may be utilized, which is intended to replace the corresponding part of Fig. 3 between lines B—B and C—C thereof. The circuit of Fig. 8 is essentially a double detector circuit. Thus, the control voltage derived across leads 46 and 47 is supplied to respective second rectifiers 39' and 41' having corresponding load resistors 42' and 43' and by-pass condensers 44' and 45'. By proper choice of the time constants of these latter circuits 42', 44' and 43', 45', the output voltage derived across leads 46', 47' will again be of the modulating frequency, and the effect of the pulsed nature of the reference frequency wave is eliminated. It will be understood that the circuit of Fig. 8 may be utilized with the circuit of Fig. 3 or with that circuit modified as in Figs. 4, 5 or 6, with or without the modification of Fig. 7.

Fig. 9 shows the application of the present invention to the frequency control of a "reflex klystron" oscillator 57 such as is illustrated in Fig. 2 of U. S. Patent 2,250,511. Such a "reflex klystron" oscillator comprises a cavity resonator 58 having a pair of electron permeable electrodes or grids defining an electron permeable gap 59. An electron beam from a suitable cathode or electron gun 61 is projected through this gap 59 toward reflector electrode 62, under the influence of an accelerating battery 63, connected between the cathode 61 and the grounded resonator 58.

Reflector 62 is maintained at a suitable slight potential difference with respect to cathode 61 by means of the variable tap 64 on battery 63. Accordingly, reflector 62 is at a high negative potential with respect to the exit grid of resonator 58 and serves to reflect the electron beam and to cause it to reenter the gap 59. By suitable choice of the accelerating and reflector voltage with respect to the resonant frequency of resonator 58, self-sustained oscillations are generated within resonator 58 and may be extracted therefrom by a suitable output connection 65 in the form of a concentric transmission line having a coupling loop 66 coupled to the field within resonator 58.

In order to adjust the output frequency of such an oscillator, the resonant frequency of the resonator 58 may be adjusted. For this purpose one wall 67 of oscillator 58 is made flexible, permitting adjustment of the length of the gap 59 and consequent change in the resonant frequency of the resonator 58. In the present instance, the oscillator 58 is thermally tuned by means of a thermally-expansible tuning strut 68 between the flanges 69 and 71 which are rigidly connected to the respective resonator grids. Thus expansion or contraction of the strut 68 will produce corresponding change in the gap 59. It is to be understood that suitable means (not shown) coupled with atmospheric pressure act to cause gap 59 to become smaller. This tendency is opposed by strut 68. If desired, several struts such as 68 may be utilized suitably spaced about the axis of the electron beam.

To provide expansion or contraction of strut 68, suitable energizing electrical current is supplied thereto by a lead 72. In the present instance lead 72 is shown connected at the center point 73 of strut 68, the outer ends of strut 68 being grounded. In this way, any current supplied through lead 72 flows through the respective halves of strut 68, and the resultant heating due to passage of this current will cause expansion of the strut. A reduction in the current supply will result in cooling and contraction of the strut. If desired, other means for applying heat to cause thermal expansion of strut 68 may be utilized, such as a heating coil or resistance wound around or closely adjacent strut 68.

In utilizing the present invention to control an oscillator of the type illustrated in Fig. 9, the current supplied to strut 68 by way of lead 72 is controlled by the alternating control signal derived by the discriminator 15 as in Fig. 3, which may be modified, as desired, in accordance with Figs. 4, 5, 6 or 8. Thus in Fig. 9, the modulator 20 is the same as in Fig. 6, while the discriminator is the same as in Fig. 3, except that the ground connection 36 in Fig. 3 is omitted. In this instance, output lead 47 of the discriminator is connected directly to ground and output lead 46 is connected to the grid of an amplifier tube 74 through a coupling and direct current blocking condenser 75. A suitable input resistance 76 is connected between this grid and ground. The anode of tube 74 is then connected through the primary winding 77 of an output transformer 78 to the positive potential source 26. Accordingly, the voltage derived across the secondary winding 79 of transformer 78 will be an amplified version of the reversible-phase output signal, derived from the discriminator.

In order to provide a manual adjustment for the controlled oscillator frequency, and to be able to set the frequency at which control is to be maintained, the secondary winding 79 is connected in series with the secondary winding 81 of another transformer 82, whose primary winding 83 is energized from the source 19 through a suitable adjustable voltage divider 84. Source 19 is adjusted in phase to be in phase coincidence or phase opposition to the voltage produced by the secondary winding 79. Accordingly, this control voltage of winding 79 will either add to or subtract from the reference or datum potential supplied by winding 81. The resultant of these two voltages is then impressed between the lead 72 and ground and serves to energize the tuning strut 68. The phase sense of the voltage produced by secondary 79 relative to the frequency change of oscillator 57 is selected to cause the frequency of oscillator 57 to vary with respect to the signal from transformer 79, in a sense to reduce this signal by the resulting change in the intermediate frequency. It will be clear that voltage divider 84 may be used to adjust the output frequency of oscillator 57 in the absence of any frequency-controlling action. The frequency control derived from the discriminator 15 then serves to increase or decrease the energy of the strut 68 and correspondingly varies the frequency of oscillator 57.

In the system of Fig. 9, the frequency of source 19 is preferably chosen to have a sufficiently high value so as to be above the highest frequency of any modulation which may be utilized when the output of oscillator 57 is modulated, or where the reference frequency source 12 (Fig. 2) is modulated, so that any resulting frequency modulation sidebands will be outside the useful range. This energizing frequency is also chosen sufficiently high so that the thermal inertia of the strut 68 will substantially prevent the frequency output of oscillator 57 from following the rapid instantaneous fluctuations in the energizing current.

The amplifier 74 of Fig. 9 need not be a single ended amplifier. As shown in Fig. 9A, which may replace the corresponding parts of Fig. 9 between lines F—F and G—G, the output from the discriminator may be made balanced by grounding the junction of resistors 42 and 43 instead of grounding lead 47 as in Fig. 9. Then this balanced output may be amplified in a conventional push-pull amplifier 74', 74'' whose output transformer 78' has a secondary winding 79' connected in the same manner as winding 79 of Fig. 9.

The system of Fig. 10 and Fig. 10A is similar to Fig. 9 or 9A with the addition of further features carrying greater advantage. In the circuit of Fig. 9 or 9A, the change in frequency of oscillator 57 may lag behind the control signal leading to such frequency change, due to the thermal lag of the strut 68; that is, a finite time interval is necessary for the strut 68 to expand or contract in response to a change in its excitation. Where it is desirable to maintain the controlled oscillator frequency in close and continuous correspondence with the reference frequency, such a delay may be disadvantageous. The circuit of Fig. 10 overcomes the effect of such delay by additionally and simultaneously controlling the potential of the reflector electrode of the oscillator. The frequency change produced by such a change in reflector electrode voltage is substantially instantaneous. However, the tuning range by reflector voltage control is small in comparison to the tuning range by thermal strut control. Accordingly, by simultaneously controlling the frequency by reflector voltage control and thermal strut control, small required changes in frequency are produced substantially instantaneously by action of the reflector electrode. Larger changes in frequency will be partly compensated by reflector control and the remainder compensated by strut control. In this way faster control is achieved, especially for small changes where such control is desirable, and the controlled oscillator frequency is maintained closer to its desired value at all times.

In the circuit of Fig. 10, it will be seen that the strut control is exactly the same as in Fig. 9 (although the circuit of Fig. 9A may be used here), and similar elements are given the same reference numeral. In addition, however, the reversible-phase alternating output signal of discriminator 15 is also supplied to a second control tube 86 whose cathode 87 is insulated from ground in a direct current sense by means of a condenser 88. The external anode-cathode circuit of tube 86 includes a biasing circuit 89, a source of alternating potential in the form of a transformer 91 supplied from source 19, and a pair of series-connected load resistors 92 and 93, resistor 93 being by-passed with respect to currents of the frequency of source 19 by condenser 94. The circuit is so arranged that the voltage across the secondary of transformer 91 will be in phase coincidence or opposition with respect to the alternating voltage applied to the grid of tube 86 from discriminator 15.

In the absence of signal applied to tube 86, the biasing provided by circuit 89 is selected or adjusted to provide a normal current flow through resistors 93, 92 and tube 86. It will be clear that this current flow will be pulsating direct current. However, due to the by-pass condenser 94, the voltage drop across resistor 93 will be a substantially constant unidirectional voltage. The resistors 92 and 93 are so chosen that this unidirectional voltage has the proper value to supply the normal negative bias of reflector 62 with respect to cathode 61, producing the desired output frequency from oscillator 57. Upon application of the control signal from discriminator 15 upon the grid of tube 86, this normal voltage drop will be modified. If the input voltage to tube 86 is in phase coincidence with the voltage in its anode circuit, the volt drop across resistor 93 will increase, supplying a larger negative potential to reflector 62 and thereby increasing the output frequency of oscillator 57. On the other hand, if the input voltage to tube 86 is in phase opposition to the anode voltage, the volt drop across resistor 93 will decrease, producing a decrease in oscillator frequency. In this manner, the frequency of oscillator 57 is controlled simultaneously by reflector electrode control and thermal strut control so that quicker response and more constant frequency control are obtained.

If desired, of course, resistor 93 or the anode voltage of tube 86 may be made adjustable so that the normal reflector voltage, and hence the normal oscillator frequency, may be adjusted. Also, lead 90 may be connected to an adjustable voltage source instead of directly to cathode 61, to permit adjustment of the normal oscillator frequency.

Fig. 11 shows a circuit similar to Fig. 10 for controlling the reflector electrode voltage. In this instance, the discriminator 15, of the form shown in Fig. 3, produces a balanced output since the center tap is grounded as at 36. The alternating output of the discriminator 15 is supplied to a pair of electron discharge devices 96 and 97 through coupling and blocking condensers 98, 99 and 101, which freely pass the control frequency. Tubes 96 and 97 are biased by respective biasing circuits 102 and 103. An alternating voltage of the same frequency as that of the signal output from discriminator 15 is provided from source 19 by transformer 104 in the common portion of the anode-cathode circuit of these tubes 96 and 97. The load resistors for tubes 96 and 97 are provided by a voltage divider 105 whose variable tap 106 connected to the transformer 104.

In the absence of signal from discriminator 15, variable tap 106 can be adjusted to provide a variable unidirectional output voltage of either polarity between leads 107 and 108. Thus, when the tap 106 is positioned at the center point of resistor 105, equal voltage drops will be produced in the respective halves of this resistor 105, thereby producing net zero output voltage between leads 107 and 108. By off-setting tap 106 from the center position, one or the other portion of resistor 105 will have a larger volt drop thereacross, so that the output voltage between leads 107 and 108 will have a corresponding unidirectional component. A filter circuit 109 serves to filter out all alternating current components from the voltage across leads 107 and 108, and the resultant filtered voltage is applied between the reflector 62 and cathode 61 of oscillator 57. In this way, the normal operating voltage of reflector 62 with respect to cathode 61 can be adjusted so as to adjust the normal frequency of oscillator 57.

When an alternating control signal is derived from discriminator 15, it serves to modify the operation of tubes 96 and 97 in opposite senses; that is, for a control signal of one phase-sense, tube 96 will conduct more than tube 97, while for a discriminator output voltage of opposite sense the reverse will be true. Accordingly, the reflector electrode voltage will be varied in a sense corresponding to the phase-sense of the discriminator control voltage, and automatic frequency control operation may be produced in the manner discussed in the previous figures. The strut control circuit of Fig. 9 may be added to Fig. 11 if desired.

Fig. 12 is similar to Fig. 11. However, in this instance, the balanced discriminator output is amplified by a suitable balanced amplifier 111 and is then applied to a phase-sensitive detector formed by a pair of diodes 112 and 113. The balanced voltage output from amplifier 111 is applied equally but in opposite phase to the two tubes 112 and 113 by means of the center-tapped secondary winding 114 of coupling transformer 115. A reference voltage derived from source 19 and connected in series with this center-tap is adjusted to be in phase coincidence or opposition with the control voltage. In the absence of control voltage, equal unidirectional voltages will appear across resistors 116 and 117, which are by-passed with respect to the frequency of source 19 by means of condensers 118 and 119. Since these voltages are in opposite sense, the resultant unidirectional voltage across leads 121 and 122 is zero.

For a control voltage of one phase-sense, corresponding to one sense of frequency deviation, the voltage across resistor 116 will exceed that across 117 to produce a net output between leads 121 and 122 of predetermined polarity. For a control voltage of opposite phase-sense, corresponding to an opposite frequency deviation, the voltage drop across resistor 117 will be greater than that across 116 producing an opposite polarity unidirectional voltage between leads 121 and 122. This variable polarity unidirectional voltage between leads 121 and 122 is connected in series with an adjustable voltage derived from a voltage divider 123 which is supplied either with a negative voltage from a suitable source 124 or a suitable positive voltage, as desired. The resultant voltage from this series connection may be then applied to the reflector electrode 62 as in the preceding figures. Adjustment of the voltage divider 123 will again produce adjustment of the reflector potential and of the oscillator frequency. In Fig. 12, also as in any of the preceding figures, thermal strut control may be used in addition to, or in place of, the reflector potential control shown herein.

In place of the balanced amplifier arrangement of Fig. 12, it will be understood that a single-ended amplifier may be utilized. Such a circuit is shown in Fig. 13 and may be substituted for the portion of Fig. 12 between lines D—D and E—E thereof. In this instance, the output lead 47 of the discriminator is grounded, and the center output lead is not grounded. The single-ended amplifier is shown as comprising a tube 151 serving as a conventional amplifier and having an output transformer 152 with center-tapped secondary 114' which may thereupon be connected as in Fig. 12. The operation of this circuit is believed obvious, and no further detailed description is believed necessary.

In any of the above modifications supplying a control signal for the reflector electrode of the "reflex klystron" oscillator, it will be seen that the alternating output of the discriminator is converted into a direct current signal acting as, or controlling, the reflector electrode voltage. Where desired, the converting means may be combined with the discriminator. This is shown in Fig. 14, where a reference potential derived from source 19 is impressed with like phase upon the two diodes 39 and 41 of the discriminator shown in Fig. 3. It is to be understood that the circuit of Fig. 14 combined with the high frequency oscillator of Fig. 9 may replace the corresponding portion of Fig. 3 to the right of line A—A thereof. Any of the modulators shown in Figs. 3, 4, 5 or 6 may be utilized here. The reference voltage derived from source 19 is adjusted in phase to be in phase coincidence or in phase opposition to the alternating control signal which would otherwise be derived across the output resistors 42 and 43. By-pass condensers 44 and 45 are now adjusted to by-pass currents of this modulating frequency and will, of course, also by-pass currents of the intermediate frequency.

When intermediate frequency currents of the desired frequency, modulated by the modulating frequency, are impressed upon diodes 39 and 41 in the manner described with respect to Fig. 3, these voltages in series with the voltage from the secondary of transformer 150 will produce equal and opposite unidirectional voltages across resistors 42 and 43, producing a net zero output between leads 46 and 47. However, when the intermediate frequency deviates from the desired value, an unbalanced alternating voltage would tend to appear across resistors 42 and 43. These voltages would be in phase coincidence or phase opposition to the voltage derived from transformer 150, and the combination of the modulation upon the intermediate frequency-wave and the reference voltage derived from transformer 150 produces corresponding unidirectional voltages across resistors 42 and 43 whose difference can be directly utilized in series with a suitable adjustable negative potential derived from voltage divider 123 to control the reflector electrode voltage and thereby restore the oscillator frequency to its desired value with relation to the reference frequency.

In each of the above modifications it is to be understood that the modulation of the intermediate frequency may be produced in other ways. The controlled oscillator 11 (Fig. 2) may be amplitude modulated by the modulating frequency which will, in turn, produce a modulated intermediate frequency useful in the present system in the same manner as the modulated frequency produced by modulator 20. Alternatively, the reference frequency source may be thus modulated. In each case, the essential feature is that the intermediate frequency be modulated.

It is also to be understood that the reference frequency may either be a locally generated standard frequency or may be a received electromagnetic wave. Such a received wave may be amplitude modulated at its source by the control frequency in place of modulating the intermediate frequency, as shown in the preceding figures. Fig. 15 illustrates a system of this type. Thus, in Fig. 15, the radiated wave modulated by the control frequency is received by antenna 161 and is applied to the mixer 13, which is also supplied with a local oscillator frequency wave from the controlled oscillator 11. The resulting intermediate frequency produced by mixer 13 is then amplified by a conventional intermediate frequency amplifier 14 and is applied to the input of a discriminator similar to that shown in Fig. 3, to derive across its output terminals 46 and 47 an alternating reversible-phase signal corresponding in magnitude and phase-sense to the magnitude and sense of deviation of the intermediate frequency from the value to which the discriminator is tuned by means of condenser 38.

In order to operate a servo mechanism in both directions, in correspondence with the sense of this frequency deviation, it is necessary, as illustrated in Figs. 3, 7, 9, 10, 11, 12 and 14, to supply a comparison voltage of this control frequency, whereby the phase reversal of the alternating current signal derived from the discriminator may be determined by comparison with such a comparison wave.

In the preceding figures, the control frequency source 19, which modulates the intermediate frequency, has been locally available to supply directly such a comparison signal. However, in the system of Fig. 15, where no local modulation by the control frequency is produced and where the wave as received is already modulated by the control frequency, other means must be provided for producing this comparison signal. In the present Fig. 15, such a comparison signal is derived directly from the voltage across the radio frequency choke coil 37 and series-connected resistor 37'.

It will be appreciated that the current flowing through resistor 37' and choke 37 will be direct current upon which is superposed the control frequency. Substantially no components of intermediate frequency will exist in this current because of the high impedance offered by choke 37 to such intermediate frequency currents. Furthermore, since the current through resistor 37' is effectively the sum of the currents through the respective load resistors 42 and 43 of the detectors 39 and 40, this current through resistor 37' will remain substantially constant in amplitude throughout the range of operation of the discriminator. Accordingly, the voltage across resistor 37' may be utilized as the comparison signal merely by blocking out its direct current component, as by a suitable blocking condenser 162. This comparison wave may then be supplied to one winding 53 of the servo 54 to whose other winding 52 is applied an amplified version of discriminator output, similar to Fig. 3. In this manner, the comparison signal is locally generated and may be utilized in the same manner as the comparison signals for any of the servos of Figs. 3, 7, 9, 10, 11, 12 or 14.

In this circuit of Fig. 15, the control frequency may be any modulation frequency existing in the received wave. Thus, if the servo is of the type responsive to widely varying frequencies, such as the thermal type herein disclosed, even voice or music modulation on the received wave may be used as the control frequency. Also, if desired, the control frequency may be outside the usual modulation range, or it may be amplitude modulated upon a carrier which is frequency modulated by other intelligence. In such a case, suitable filters would be used to separate the control frequency from other frequencies. Also, the comparison voltage may be derived as the voltage between the high voltage terminal of resistor 37' and ground, so as to avoid the volt-drop across choke 37 which may have some intermediate frequency components.

It is to be understood that in any of the above embodiments of the present invention, the controlled oscillator 11 may directly produce the wave supplied to the modulator or discriminator. In such case, the reference frequency source 12 and mixer 13 are unnecessary, and the discriminator will be tuned to the desired oscillator frequency. The oscillator output will, of course, be modulated in any of the manners discussed above to produce the useful results of the present invention.

Furthermore, in each of the modifications disclosed above, the output of the discriminator, or amplifier or control circuit excited therefrom, may be utilized to actuate an indicator instead of to control frequency as illustrated. In this way the intermediate frequency deviation from its desired value may be indicated rather than controlled.

All of the above described modifications of the present invention have been directed to the problem of maintaining a constant frequency which may be supplied or used where desired. However, the principles of the present invention are also applicable to other types of circuits. Thus, instead of utilizing the output of the discriminator to readjust the frequency input to the discriminator and maintain this frequency constant, it is also possible to merely retune the discriminator so as to stay tuned to the input frequency. By coupling a desired controlled object to the discriminator tuning means, this controlled object will then be adjusted in correspondence with the input frequency to the discriminator. This type of system will then operate to position or adjust a controlled object in correspondence with a variable frequency.

One use of such a system may be in automatic tuning receiving systems. Thus, if the controlled object is the tuning apparatus for a receiver of the received wave, by the present invention such tuning apparatus may be kept in resonance with the received wave.

A further use of such a system may be in a followup or control system in which the variation or deviation of a controlling object from a desired condition produces an alternating output wave of a frequency corresponding to such deviation. By applying such a variable frequency to a system of the type just described, a controlled object may be kept in synchronism or correspondence with the controlling object.

One form of system of this type is illustrated in Fig. 16. In this instance the variable frequency input derived in any suitable manner, either as discussed above or otherwise, is supplied to the modulator 20 and is therein modulated by the control frequency derived from source 19. This modulated variable frequency is then supplied to the discriminator 15 whose tuning condenser 38 is actuated from the servo 21 by any suitable mechanical coupling indicated schematically at 21'. The output of discriminator 15 is applied to a suitable amplifier circuit 30 and thereupon actuates the servo 21 and its control circuit. A comparison signal is also supplied to this servo control circuit from control frequency source 19. Servo 21 may be of any of the types illustrated in the present application, or other suitable types.

It will be clear that if the input frequency is equal to that to which the discriminator circuit 38, 33 is tuned, no output will be derived from the discriminator and the servo 21 will remain stationary. However, if the input variable frequency differs from this tuned frequency, a signal will be derived from the discriminator 15 having an amplitude and phase-sense corresponding respectively to the magnitude and sense of deviation of the input frequency from the discriminator tuned frequency. This signal is supplied to servo 21 through the circuit 30 and serves to retune the discriminator 15 to the input frequency.

At the same time, a suitable controlled object 163 may be mechanically coupled to the mechanical coupling 21' to be simultaneously actuated thereby. In this manner, the controlled object 163 is controlled in accordance with and in direct correspondence to the input variable frequency. As stated above, the controlled object may be the tuning mechanism for a receiver whereby the receiver may be tuned to the incoming wave, or may be the driven member of a follow-up system where the variable frequency corresponds to the displacement of a controlling object. Other uses of the circuit of Fig. 16 will be apparent.

It is to be understood that any of the modifications of the invention discussed with respect to Figs. 1 to 15, may be adapted for use in a fashion similar to Fig. 16 merely by causing the servo mechanism, whether of the electric motor or thermal expansion type, to retune the discriminator 15 instead of to adjust the frequency of the controlled oscillator or intermediate frequency wave.

Since many changes could be made in the above construction and many apparently widely different embodiments of this invention could

What is claimed is:

1. Frequency control apparatus comprising a source of reference frequency, an oscillator having a frequency-determining cavity resonator and linearly extensible, thermally-actuated means for varying the frequency of said resonator, means for mixing said reference frequency and the output of said oscillator to produce a difference frequency, amplifier means coupled to said mixing means for amplifying said difference frequency, means utilizing part of said amplifier means for modulating said difference frequency, frequency discriminator means coupled to said modulating means for receiving said modulated difference frequency and for producing an output reversible-phase alternating control signal of said modulating frequency and having an amplitude and phase-sense corresponding to the magnitude and sense of deviation of said difference frequency from a predetermined value, means for adding to said produced alternating control signal a fixed phase alternating voltage of said modulating frequency, and means responsive to the sum of said control signal and said added voltage for heating said thermally-actuated means to control said oscillator frequency.

2. Frequency control apparatus comprising a source of reference frequency, an oscillator having a frequency-determining electrode, means for mixing said reference frequency and said oscillator frequency to produce a difference frequency, a source of modulating frequency, plural stage amplifier means coupled to the output of said mixing means for amplifying said difference frequency, means coupling the last stage of said amplifier means and said source of modulating frequency for modulating said difference frequency by said modulating frequency, frequency discriminator means coupled to said last stage for receiving said modulated difference frequency and producing an alternating reversible-phase control signal of said modulating frequency and having a phase-sense and amplitude corresponding respectively to the sense and magnitude of deviation of said difference frequency from a desired value, means for converting said alternating control signal into a variable unidirectional voltage, means for applying said voltage to said electrode to restore said oscillator frequency to a value producing said desired difference frequency and means for adjusting the normal value of said electrode voltage, whereby the normal value of said oscillator frequency may be adjusted.

3. In a frequency control apparatus wherein a reference frequency wave and a controllable frequency wave are heterodyned to produce a difference frequency wave, the combination comprising a source of modulating frequency wave, means coupled to said source for modulating said difference frequency wave by said modulating frequency wave, frequency discriminator means adapted to produce an output signal corresponding in amplitude to the amplitude of the wave supplied thereto and to the magnitude of deviation in the frequency of said supplied wave from a predetermined frequency value, said output signal having a polarity corresponding to the sense of said frequency deviation, means connecting said modulating means to said discriminator means for supplying said modulated difference frequency wave to said discriminator means, whereby said output signal is a reversible-phase variable magnitude control signal, alternating current amplifier means coupled to the output of said discriminator means for amplifying said control signal, and means for altering the frequency of said controllable frequency wave by said amplified control signal to restore the frequency of said difference frequency wave to said predetermined value, said last named means comprising a linearly extensible thermally-expansible member and said amplifier means comprising an electron discharge tube device having a plate electrode, means connected to said plate electrode for providing an amplified version of said control signal, and adjustable phase-varying means coupling said source of modulating frequency wave in series with said member and said control signal, whereby a resultant wave is derived and applied to said member.

4. Frequency control apparatus, comprising a source of electromagnetic waves of frequency to be controlled, means for modulating said waves in accordance with a modulating frequency, frequency discriminator means responsive to said modulated wave for producing a reversible-phase control signal of said modulating frequency with an amplitude and phase sense corresponding respectively to the magnitude and sense of deviation of said source frequency from a predetermined value, and means responsive to said reversible-phase control signal for varying said source frequency in a sense to restore it to said predetermined value, said last named means comprising phase detector means responsive to a version of the output of said frequency discriminator means for providing unidirectional output voltage varying according to frequency, and means responsive thereto for adjusting said frequency source.

5. Frequency control apparatus as defined in claim 4 wherein said last named means comprises an oscillator tube including a direct-voltage responsive frequency control electrode for receiving said unidirectional output voltage.

6. Frequency control apparatus as defined in claim 4, wherein said means responsive to said reversible-phase control signal includes means for amplifying said reversible-phase control signal.

DANIEL S. PENSYL.

REFERENCES CITED

The following references are of record in the file of this patent:

UNITED STATES PATENTS

| Number | Name | Date |
| --- | --- | --- |
| 1,934,400 | Bollman | Nov. 7, 1933 |
| 1,942,602 | Hyland | Jan. 9, 1934 |
| 2,041,855 | Ohl | May 26, 1936 |
| 2,151,127 | Logan | Mar. 21, 1939 |
| 2,245,627 | Varian | June 17, 1941 |
| 2,294,942 | Varian | Sept. 8, 1942 |
| 2,303,654 | Newton | Dec. 1, 1942 |
| 2,337,214 | Tunick | Dec. 21, 1943 |
| 2,379,689 | Crosby | July 3, 1945 |
| 2,404,344 | Wild | July 16, 1946 |
| 2,452,575 | Kenny | Nov. 2, 1948 |

FOREIGN PATENTS

| Number | Country | Date |
| --- | --- | --- |
| 537,518 | Great Britain | June 25, 1941 |